United States Patent
Tang et al.

(10) Patent No.: US 12,002,996 B2
(45) Date of Patent: Jun. 4, 2024

(54) BATTERY MODULE, BATTERY PACK, DEVICE USING BATTERY MODULE AS POWER SOURCE, AND METHOD OF MANUFACTURING BATTERY MODULE

(71) Applicant: Contemporary Amperex Technology Co., Limited, Ningde (CN)

(72) Inventors: Yu Tang, Ningde (CN); Mingdi Xie, Ningde (CN); Zhanyu Sun, Ningde (CN); Kaijie You, Ningde (CN); Xingdi Chen, Ningde (CN); Long Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 634 days.

(21) Appl. No.: 17/167,967

(22) Filed: Feb. 4, 2021

(65) Prior Publication Data
US 2021/0351480 A1  Nov. 11, 2021

Related U.S. Application Data

(63) Continuation of application No. PCT/CN2020/088877, filed on May 7, 2020.

(51) Int. Cl.
*H01M 50/519* (2021.01)
*H01M 50/526* (2021.01)
(Continued)

(52) U.S. Cl.
CPC ....... *H01M 50/519* (2021.01); *H01M 50/526* (2021.01); *H01M 50/531* (2021.01); *H01M 50/591* (2021.01)

(58) Field of Classification Search
CPC ............ H01M 50/502; H01M 50/521; H01M 50/522; H01M 50/524; H01M 50/526
See application file for complete search history.

(56) References Cited

U.S. PATENT DOCUMENTS

2014/0154559 A1* 6/2014 Mori .................. H01M 50/24
  429/159
2014/0255748 A1* 9/2014 Jan .................... H01M 10/04
  429/158
(Continued)

FOREIGN PATENT DOCUMENTS

CN  102047471 A  5/2011
CN  203746993 U  7/2014
(Continued)

OTHER PUBLICATIONS

Extended European Search Report issued in European Application No. 20841846.7, dated Jul. 26, 2021, 27 pages.
(Continued)

*Primary Examiner* — Imran Akram
(74) *Attorney, Agent, or Firm* — STERNE, KESSLER, GOLDSTEIN & FOX P.L.L.C.

(57) ABSTRACT

A battery module, a battery pack, a device using a battery module as a power source, and a method of manufacturing a battery module are provided. The battery module includes: at least two battery cells; a connecting piece configured to electrically connect two battery cells of at least two battery cells; and a protective layer including a first protective portion configured to cover the connecting piece. A melting point of the first protective portion is greater than that of the connecting piece.

16 Claims, 5 Drawing Sheets

(51) Int. Cl.
    *H01M 50/531* (2021.01)
    *H01M 50/591* (2021.01)

(56) References Cited

U.S. PATENT DOCUMENTS

| | | | |
|---|---|---|---|
| 2014/0349151 A1* | 11/2014 | Tsukamoto | H01M 50/562 |
| | | | 429/61 |
| 2015/0140367 A1* | 5/2015 | Yagi | H01M 10/6551 |
| | | | 429/50 |
| 2016/0093864 A1 | 3/2016 | Nakamura et al. | |
| 2016/0301059 A1 | 10/2016 | Lu et al. | |
| 2016/0365562 A1 | 12/2016 | Sugiyama et al. | |
| 2017/0005384 A1 | 1/2017 | Harris et al. | |
| 2018/0261804 A1 | 9/2018 | Bayles et al. | |
| 2018/0366846 A1* | 12/2018 | Matsunaga | H01M 50/569 |
| 2019/0273277 A1* | 9/2019 | Wakimoto | H01M 50/55 |
| 2019/0296315 A1* | 9/2019 | Reimer | H01M 50/526 |
| 2019/0319232 A1* | 10/2019 | Ryu | H01M 10/613 |
| 2019/0389318 A1* | 12/2019 | Lee | H01M 50/516 |
| 2020/0020914 A1* | 1/2020 | Fukushima | H01M 50/507 |
| 2020/0127249 A1 | 4/2020 | Yoon et al. | |
| 2020/0203777 A1* | 6/2020 | Wang | H01M 10/425 |
| 2020/0203941 A1* | 6/2020 | Ing | H05K 1/118 |
| 2021/0050566 A1 | 2/2021 | Wang et al. | |
| 2021/0050635 A1 | 2/2021 | Lee et al. | |
| 2021/0242530 A1 | 8/2021 | Zhu et al. | |
| 2022/0263169 A1 | 8/2022 | Ryu et al. | |

FOREIGN PATENT DOCUMENTS

| | | |
|---|---|---|
| CN | 203967152 U | 11/2014 |
| CN | 104377333 A | 2/2015 |
| CN | 204391174 U | 6/2015 |
| CN | 104777333 A | 7/2015 |
| CN | 105470441 A | 4/2016 |
| CN | 207409537 U | 5/2018 |
| CN | 109103405 A | 12/2018 |
| CN | 208819949 U | 5/2019 |
| CN | 209822756 U | 12/2019 |
| CN | 110710019 A | 1/2020 |
| CN | 110931694 A | 3/2020 |
| CN | 110970585 A | 4/2020 |
| DE | 102014001975 A1 | 8/2015 |
| EP | 3 761 397 A1 | 1/2021 |
| JP | 2010218797 A | 9/2010 |
| JP | 2014110233 A | 6/2014 |
| JP | 2015049932 A | 3/2015 |
| JP | 2017004741 A | 1/2017 |
| JP | 2018106800 A | 7/2018 |
| JP | 2020017395 A | 1/2020 |
| JP | 2020507903 A | 3/2020 |
| KR | 1020190078094 A | 7/2019 |
| WO | 2009121613 A1 | 10/2009 |
| WO | 2018174451 A1 | 9/2018 |
| WO | 2019112197 A1 | 6/2019 |
| WO | 2019141149 A1 | 7/2019 |
| WO | WO-2020067665 A1 * | 4/2020 ......... H01M 10/613 |
| WO | 2020214383 A1 | 10/2020 |

OTHER PUBLICATIONS

Chinese Office Action issued in Chinese Application No. 201780022813.2, dated Sep. 1, 2022, 10 pages.
EPO Examination Report for EP 20 841 846.7, dated Sep. 26, 2023, 56 pages.
Office Action Issued by CNIPA for CN 202080005465.X, dated Sep. 11, 2023, 10 pages.
Notice of Reasons for Refusal from the JPO for JP2022541008, mailed on Jan. 30, 2024, 4 pages.

* cited by examiner

BATTERY MODULE, BATTERY PACK, DEVICE USING BATTERY MODULE AS POWER SOURCE, AND METHOD OF MANUFACTURING BATTERY MODULE

CROSS-REFERENCE TO RELATED APPLICATION

This application is a continuation of International Application No. PCT/CN2020/088877, filed on May 7, 2020, which is incorporated by reference herein in its entirety.

TECHNICAL FIELD

The present disclosure relates to the field of battery technologies, and more particularly, to a battery module, a battery pack, a device using a battery module as a power source, and a method of manufacturing a battery module.

BACKGROUND

A battery module has a plurality of battery cells electrically connected to each other, and two battery cells are electrically connected together through a connecting piece. In the process of using the battery module, sometimes thermal runaway of one of the battery cells may cause thermal runaway of the entire battery module.

SUMMARY

A first aspect of the present disclosure provides a battery module, which includes:
  at least two battery cells;
  a connecting piece being configured to electrically connect two battery cells of the at least two battery cells; and
  a protective layer including a first protective portion being configured to cover the connecting piece, wherein a melting point of the first protective portion is greater than that of the connecting piece.

In the battery module according to some embodiments, the first protective portion includes:
  a first upper protective portion being configured to cover an upper surface of the connecting piece far away from the at least two battery cells; and
  a first lower protective portion arranged opposite to the first upper protective portion and being configured to cover a lower surface of the connecting piece facing to the at least two battery cells.

In the battery module according to some embodiments, the first protective portion further includes a first side protective portion being configured to cover an outer side of the connecting piece arranged between the upper surface and the lower surface of the connecting piece.

In the battery module according to some embodiments, the first side protective portion is connected to the first upper protective portion and/or the first lower protective portion.

In the battery module according to some embodiments, the first protective portion is attached to the connecting piece.

In the battery module according to some embodiments, the first protective portion is adhered to the connecting piece.

In the battery module according to some embodiments, the first protective portion is made from an insulating material with a melting point greater than or equal to 660° C.

In the battery module according to some embodiments, the battery module further includes a circuit board electrically connected to the at least two battery cells; and
  the protective layer further includes a second protective portion being configured to cover the circuit board.

In the battery module according to some embodiments, the second protective portion and the first protective portion are made from the same material.

In the battery module according to some embodiments, the second protective portion is connected to the first protective portion.

In the battery module according to some embodiments, the second protective portion includes:
  a second upper protective portion being configured to cover an upper surface of the circuit board far away from the at least two battery cells; and
  a second lower protective portion arranged opposite to the second upper protective portion and being configured to cover a lower surface of the circuit board facing to the at least two battery cells.

In the battery module according to some embodiments, the battery module further includes an output electrode being configured to output electrical energy of the battery module, wherein a first end of the output electrode is configured to electrically connect to the at least two battery cells; and
  wherein the protective layer further includes a third protective portion being configured to cover the first end of the output electrode.

In the battery module according to some embodiments, the third protective portion and the first protective portion are made from the same material.

In the battery module according to some embodiments, the third protective portion is connected to the first protective portion.

In the battery module according to some embodiments, the third protective portion includes:
  a third upper protective portion being configured to cover an upper surface of the first end of the output electrode far away from the at least two battery cells; and
  a third lower protective portion arranged opposite to the third upper protective portion and being configured to cover a lower surface of the first end of the output electrode facing to the at least two battery cells.

In the battery module according to some embodiments, the third protective portion further includes a second side protective portion being configured to cover an outer side of the first end of the output electrode arranged between the upper surface and the lower surface of the first end of the output electrode.

In the battery module according to some embodiments, the battery module further includes a fixing layer arranged outside the protective layer and the connecting piece to fix the protective layer and the connecting piece as a whole.

In the battery module according to some embodiments, the fixing layer includes:
  an upper fixing layer arranged above the connecting piece and the protective layer; and
  a lower fixing layer arranged below the connecting piece and the protective layer.

In the battery module according to some embodiments, the upper fixing layer is hermetically connected to the lower fixing layer.

A second aspect of the present disclosure provides a battery pack, which includes the battery module according to the first aspect of the present disclosure.

A third aspect of the present disclosure provides a device using a battery module as a power source, wherein the battery module includes the battery module according to the first aspect of the present disclosure.

A fourth aspect of the present disclosure provides a method of manufacturing a battery module, which includes:
providing at least two battery cells;
providing a connecting piece to connect the connecting piece to two battery cells of at least two battery cells; and
providing a protective layer including a first protective portion and causing the first protection portion to cover the connecting piece, wherein a melting point of the first protective portion is greater than that of the connecting piece.

BRIEF DESCRIPTION OF THE DRAWINGS

The accompanying drawings described herein are intended for providing further understanding of the present disclosure, and constituting a part of the present disclosure. The exemplary embodiments of the present disclosure and description thereof are intended for explaining the present disclosure, but not for constituting an improper limitation on the present disclosure. In the drawings.

DETAILED DESCRIPTION

Figure 1:
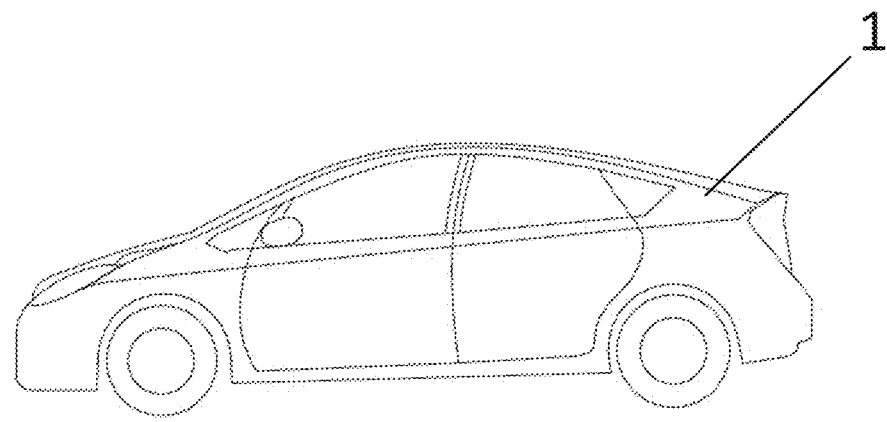
FIG. 1 is a schematic structural diagram of a device using a battery module as a power source according to an embodiment of the present disclosure.

Technical solutions in the embodiments of the present disclosure will be described clearly and completely below, in conjunction with the accompanying drawings in the embodiments of the present disclosure. The described embodiments are some but not all of the embodiments of the present disclosure. The following description of at least one exemplary embodiment is illustrative, and in no way serves as any limitation on the present disclosure and application or use thereof. All other embodiments obtained by persons of ordinary skill in the art based on the embodiments of the present disclosure without creative efforts shall fall within the protection scope of the present disclosure.

The relative arrangement, numerical expressions, and numerical values of the components and steps set forth in these embodiments do not limit the scope of the present disclosure unless otherwise specifically stated. Also it is to be understood that for the ease of description, sizes of parts as shown in the accompanying drawings are not drawn according to an actual proportional relation. Technologies, methods and equipment known to those of ordinary skill in the related art may not be discussed in detail, but where appropriate, the technologies, methods and equipment should be considered as part of the authorized specification. In all examples shown and discussed herein, any specific values should be interpreted as merely exemplary and not limiting. Therefore, other examples of the exemplary embodiment may have different values. It is to be noted that similar reference numerals and letters indicate similar items in the following accompanying drawings. Therefore, once an item is defined in one drawing, there is no need to discuss this item further in subsequent drawings.

In the description of the present disclosure, it is to be understood that the use of "first", "second" and other terms to limit parts or physical quantities, is only to facilitate the distinction between the corresponding parts or physical quantities. If not otherwise stated, the above terms have no special meaning, and therefore cannot be interpreted as restrictions on the protection scope of the present disclosure.

In the description of the present disclosure, it is to be understood that positions or positional relationships indicated by the position words such as "front, rear, upper, lower, left, right", "transverse, vertical, perpendicular, horizontal" and "top, bottom" are generally based on the positions or positional relationships as shown in the accompanying drawings, and are merely for ease of a description of the present disclosure and a simplified description. Unless otherwise stated, these position words are not intended to indicate or imply the device or element to have a special position or to be operated in a special position. Thus, these position words cannot be interpreted as restrictions on the protection scope of the present disclosure. The position words "inside", "outside" refer to inside or outside the contours of the parts themselves.

The embodiments of the present disclosure provide a battery module, a battery pack, a device using a battery module as a power source, and a method of manufacturing a battery module.

The device using a battery module as a power source includes the battery module of the present disclosure. The device may be, for example, a vehicle, a ship, or an energy storage device, etc. FIG. 1 is a schematic structural diagram of a device using a battery module as a power source according to an embodiment of the present disclosure, wherein the device may be specifically a vehicle 1.

Figure 2:
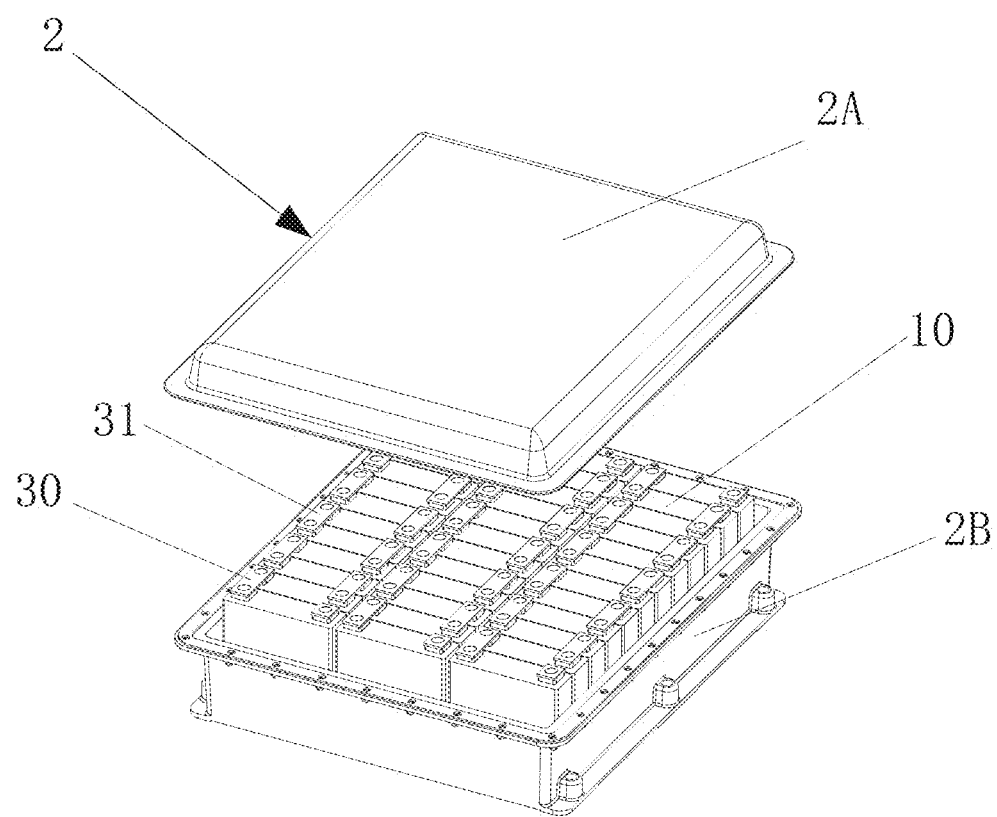
FIG. 2 is a schematic structural diagram of a battery pack according to an embodiment of the present disclosure.

The battery pack includes a battery pack shell and a battery module arranged in the battery pack shell. The battery module is the battery module of the present disclosure. The battery modules of the battery pack may be one or more groups. FIG. 2 is a schematic structural diagram of a battery pack 2 according to an embodiment of the present disclosure. A shell of the battery pack 2 includes an upper case 2A and a lower case 2B, and the battery module is arranged in a housing space of the shell. The battery pack and the device using a battery module as a power source according to the embodiments of the present disclosure both have the advantages of the battery module according to the embodiments of the present disclosure.

The structure and advantages of the battery module according to the embodiments of the present disclosure will be described in the following.

In the development of the present disclosure, it is found that when thermal runaway occurs in one of the battery cells of the battery module, the battery cell spouts a flame, which may fuse a connecting piece electrically connecting two battery cells. Furthermore, if the connecting piece is fused, metal particles sprayed out may cause an external short circuit of the remaining battery cells, which may cause thermal runaway of the battery cells that have the external short circuit, and cause a chain reaction, thereby causing thermal runaway of the entire battery module.

In order to reduce thermal runaway of the battery module, as shown in FIG. 2 to FIG. 8, the battery module according to the embodiments of the present disclosure includes more than two battery cells 10, connecting pieces 20 (the connecting pieces are covered by protective layers 30 in FIG. 2 and thus are not shown) and protective layers 30. The connecting piece 20 electrically connects two battery cells 10. The protective layer 30 includes a first protective portion 31 which covers the connecting piece 20, wherein a melting point of the first protective portion 31 is greater than that of the connecting piece 20. The connecting piece 20 is made of metal such as aluminum, copper or nickel.

The first protective portion 31 covers the connecting piece 20, and a melting point of the first protective portion 31 is greater than that of the connecting piece 20, which not only is advantageous to prevent the connecting piece 20 from being fused by high temperature, but also is advantageous to prevent the connecting piece 20 from touching the metal particles sprayed out of the battery cells 10 where thermal runaway occurs. In this way, it is advantageous to prevent the battery cells 10 from a short circuit, and to prevent the battery module from generating a chain thermal runaway, such that safety performance of the battery module and safety performance of the battery pack including the battery module are improved.

Figure 4:
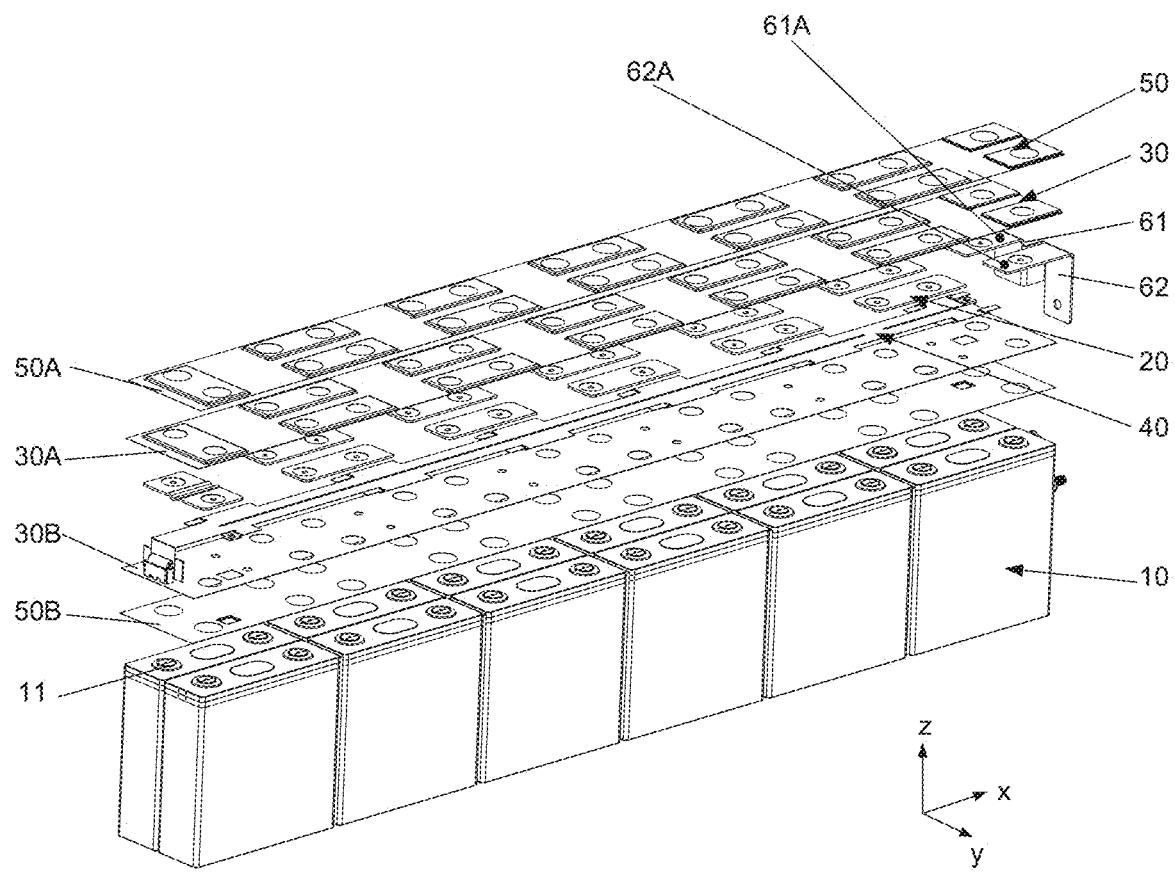
FIG. 4 is an exploded schematic diagram of the battery module as shown in FIG. 3.
Figure 5:
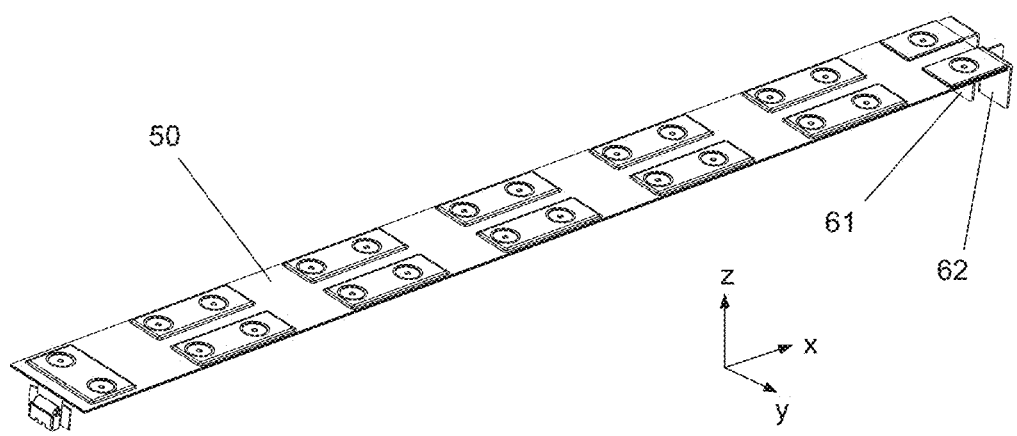
FIG. 5 is a schematic structural diagram of a busbar assembly of the battery module as shown in FIG. 3.
Figure 6:
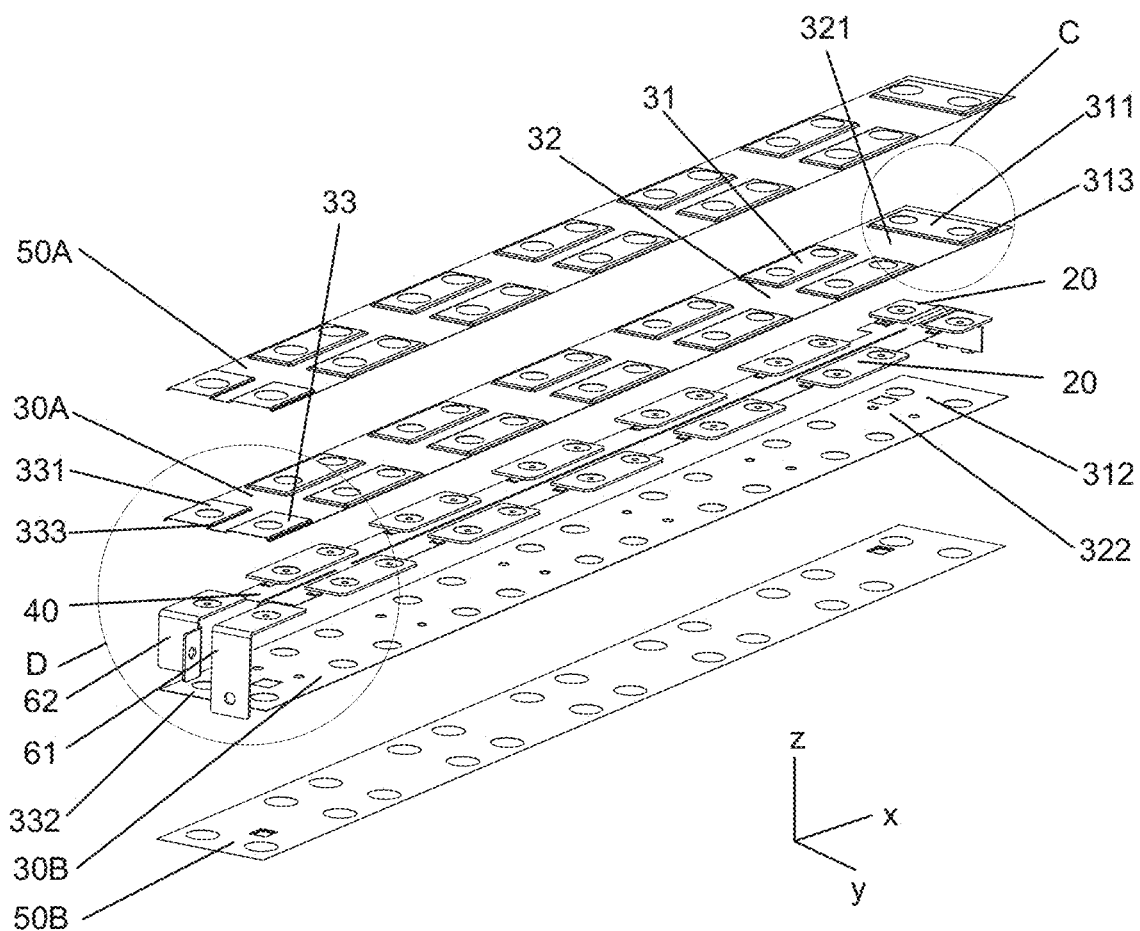
FIG. 6 is an exploded schematic diagram of the busbar assembly as shown in FIG. 5.

As shown in FIG. 4 and FIG. 6, in the battery module according to some embodiments, the first protective portion 31 includes a first upper protective portion 311 and a first lower protective portion 312. The first upper protective portion 311 covers an upper surface of the connecting piece 20 far away from the battery cells 10. The first lower protective portion 312 is arranged opposite to the first upper protective portion 311 and covers a lower surface of the connecting piece 20 facing to the battery cells 10.

The first protective portion 31 includes the first upper protective portion 311 and the first lower protective portion 312, which facilitates the protective layer 30 to form a complete coverage of the connecting piece 20 and facilitates achieving a protective effect of the protective layer 30 on the connecting piece 20.

Figure 7:
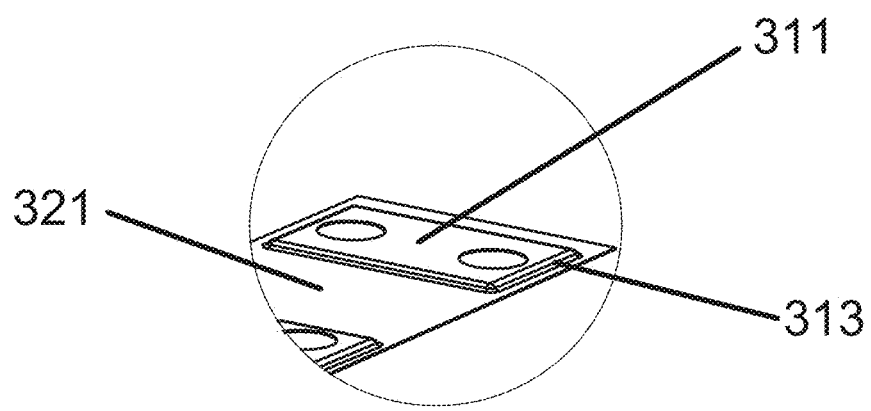
FIG. 7 is a schematic diagram of an enlarged structure of Part C of the busbar assembly as shown in FIG. 6.

As shown in FIG. 4, FIG. 6 and FIG. 7, in the battery module according to some embodiments, the first protective portion 31 further includes a first side protective portion 313 which covers an outer side of the connecting piece 20 arranged between the upper surface and the lower surface of the connecting piece 20.

The first protective portion 31 includes the first side protective portion 311, which facilitates the protective layer 30 to form a complete coverage of the connecting piece 20 and facilitates achieving the protective effect of the protective layer 30 on the connecting piece 20.

In the battery module according to some embodiments, the first side protective portion 313 is connected to the first upper protective portion 311 and/or the first lower protective portion 312. This not only facilitates fabrication of the protective layer 30, but also facilitates assembly of the protective layer 30 and other parts of the battery module.

In the battery module according to some embodiments, the first protective portion 31 is attached to the connecting piece 20. The attachment between the first protective portion 31 and the connecting piece 20 is advantageous to reduce a distance between the first protective portion 31 and the connecting piece 20, thereby reducing space occupied by the first protective portion 31 and the connecting piece 20, and increasing the energy density of the battery module. Furthermore, the attachment between the first protective portion 31 and the connecting piece 20 is advantageous to ensure the connecting piece 20 to maintain its original shape at a higher temperature, and also is advantageous for the first protective portion 31 to better protect the connecting piece 20 covered by the first protective portion 31.

In the battery module according to some embodiments, the first protective portion 31 is adhered to the connecting piece 20. The adhesion between the first protective portion 31 and the connecting piece 20 facilitates the fixation of the first protective portion 31 with respect to the connecting piece 20, which helps to prevent the first protective portion 31 from being separated or displaced from the connecting piece 20, thereby enabling the first protective portion 31 to reliably play a protective role.

In the battery module according to some embodiments, the first protective portion 31 is made from an insulating material with a melting point greater than or equal to 660° C. For example, the first protective portion 31 may be made of mica paper, mica sheet or ceramic materials. These materials are materials with good heat resistance and insulation properties. The first protective portion 31 can play the role of heat resistance and insulation at the same time, which not only is advantageous to prevent the connecting piece 20 from being fused by high temperature, but also is advantageous to prevent contact between the connecting piece 20 and the metal particles sprayed out of the battery cells 10 where thermal runaway occurs. Therefore, it is advantageous to prevent short circuit of the battery cells 10, and thus it is beneficial for the first protective portion 31 to exert a better protective effect.

As shown in FIG. 4 and FIG. 6, the battery module according to some embodiments further includes a circuit board 40 electrically connected to the battery cells 10. The protective layer 30 further includes a second protective portion 32 which covers the circuit board 40. The protective layer 30 is provided with a second protective portion 32 covering the circuit board 40, which is beneficial to prevent a sampling functionality of the circuit board 40 from being disabled due to burnout of the circuit board 40 in the event of thermal runaway of the battery module. In this way, a battery management system of the battery pack can send an alarm signal in time according to sampling data transmitted by the circuit board in case that the battery module breaks down.

In the battery module according to some embodiments, the second protective portion 32 and the first protective portion 31 are made from the same material. This not only facilitates manufacturing of the first protective portion 31 and the second protective portion 32 of the protective layer 30, but also facilitates ensuring the protective effect of the circuit board 40.

As shown in FIG. 4 and FIG. 6, in the battery module according to some embodiments, the second protective portion 32 is connected to the first protective portion 31. This not only facilitates fabrication of the protective layer 30, but also facilitates assembly of the protective layer 30 and other parts of the battery module.

As shown in FIG. 4 and FIG. 6, in the battery module according to some embodiments, the second protective portion 32 includes a second upper protective portion 321 and a second lower protective portion 322. The second upper protective portion 321 covers an upper surface of the circuit board 40 far away from the battery cells 10. The second lower protective portion 322 is arranged opposite to the second upper protective portion 321 and covers a lower surface of the circuit board 40 facing to the battery cells 10.

The second protective portion 32 includes the second upper protective portion 321 and the second lower protective portion 322, which is advantageous to implement a complete coverage of the circuit board 40 and to implement the protective effect of the second protective portion 32 on the circuit board 40.

Figure 8:
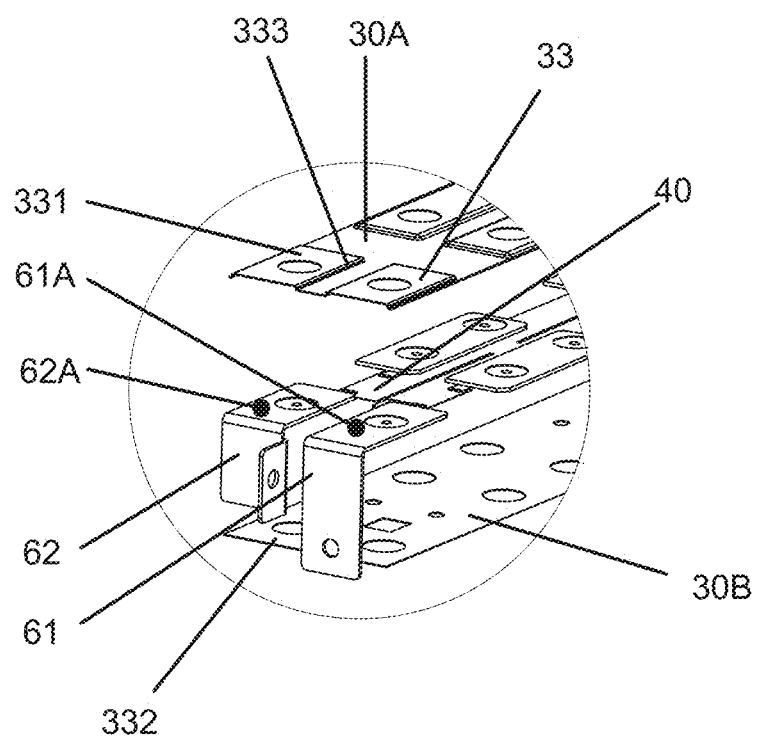
FIG. 8 is a schematic diagram of an enlarged structure of Part D of the busbar assembly as shown in FIG. 6.

As shown in FIG. 4, FIG. 6 and FIG. 8, the battery module according to some embodiments further includes an output electrode configured to output electrical energy of the battery module 10, wherein a first end of the output electrode is electrically connected to the battery cells 10. The protective layer 30 further includes a third protective portion 33 which covers the first end of the output electrode. As shown in FIG. 4, FIG. 6 and FIG. 8, the battery module includes two output electrodes, that is, a positive output electrode 61 and a negative output electrode 62. The first end 61A of the positive output electrode 61 and the first end 62A of the negative output electrode 62 electrically connect the battery cells 10.

The protective layer 30 includes a third protective portion 33 which covers the first end of the output electrode, which is beneficial to prevent the output electrode from being burned out or short-circuited, and thus it is beneficial to improve the safety performance of the battery module and the safety performance of the battery pack including the battery module.

In the battery module according to some embodiments, the third protective portion 33 and the first protective portion 31 are made from the same material. This not only facilitates manufacturing of the protective portions of the protective layer 30, but also facilitates ensuring the protective effect of the output electrode.

In the battery module according to some embodiments, the third protective portion 33 is connected to the first protective portion 31. This not only facilitates fabrication of the protective layer 30, but also facilitates assembly of the protective layer 30 and other parts of the battery module.

In the battery module according to some embodiments, the third protective portion 33 includes a third upper protective portion 331 and a third lower protective portion 332. The third upper protective portion 331 covers an upper surface of the first end of the output electrode far away from the battery cells 10. The third lower protective portion 332 is arranged opposite to the third upper protective portion 331 and covers a lower surface of the first end of the output electrode facing to the battery cells 10.

The third protective portion 33 includes the third upper protective portion 331 and the third lower protective portion 332, which facilitates a complete coverage of the first end of the output electrode and facilitates achieving a protective effect of the protective layer 30 and the third protective portion 33 thereof on the output electrode.

In the battery module according to some embodiments, the third protective portion 33 further includes a second side protective portion 333 which covers an outer side of the first end of the output electrode arranged between the upper surface and the lower surface of the first end of the output electrode.

The third protective portion 33 includes the second side protective portion 333, which facilitates the complete coverage of the first end of the output electrode and facilitates achieving the protective effect of the protective layer 30 and the third protective portion 33 thereof on the output electrode.

As shown in FIG. 4 and FIG. 6, the battery module according to some embodiments further includes a fixing layer 50, which is arranged outside the protective layer 30 and the connecting piece 20 and fixes the protective layer 30 and the connecting piece 20 as a whole.

The fixing layer 50 not only can play a protective effect, but also can better fix the protective layer 30 to the connecting piece 20.

In the battery module according to some embodiments, the fixing layer 50 includes an upper fixing layer 50A and a lower fixing layer 50B. The upper fixing layer 50A is arranged above the connecting piece 20 and the protective layer 30. The lower fixing layer 50B is arranged below the connecting piece 20 and the protective layer 30.

The fixing layer 50 includes an upper fixing layer 50A and a lower fixing layer 50B, which facilitates the fixing layer 50 to respectively fix the protective layers 30 on an upper side and a lower side of the connecting piece 20, so as to better exert fixation and protection effects.

In the battery module according to some embodiments, the upper fixing layer 50A is hermetically connected to the lower fixing layer 50B. For example, the hermetical connection between the upper fixing layer 50A and the lower fixing layer 50B may be implemented by a hot pressing process. Furthermore, the protective layer 30 is attached to the connecting piece 20, and the fixing layer 50 is arranged outside the protective layer 30. This arrangement can simplify the processing technology. Furthermore, shaping of the protective layer 30 and the fixing layer 50, positioning and relative fixation of the protective layer 30 and the fixing layer 50 and protected parts can be completed simultaneously through the hot pressing process.

The fixing layer 50 may be made from a polymer material with insulating properties. Insulating properties of the conductive parts (e.g., the connecting piece 20) covered by the fixing layer 50 can be enhanced by the fixing layer 50 made from the polymer material with insulating properties. In addition, the upper fixing layer 50A and the lower fixing layer 50B are hermetically connected and are made from the aforementioned polymer material with insulating properties, which can also have a waterproof effect.

The embodiments of the present disclosure also provide a method of manufacturing a battery module, including: providing at least two battery cells 10; providing a connecting piece 20 to electrically connect the two battery cells 10 of the at least two battery cells 10; and providing a protective layer 30 including a first protective portion 31 which covers the connecting piece 20, wherein a melting point of the first protective portion 31 is greater than that of the connecting piece 20.

This manufacturing method does not limit sequences of the above steps. For example, the assembly of the protective layer 30 and the connecting piece 20 may be performed prior to the assembly of the connecting piece 20 and the battery cells 10 or posterior to the assembly of the connecting piece 20 and the battery cells 10.

The method of manufacturing a battery module according to the embodiments of the present disclosure has the same advantages as the battery module according to the embodiments of the present disclosure.

The battery module according to some embodiments of the present disclosure is further described below with reference to FIG. 2 to FIG. 8.

As shown in FIG. 2, in some embodiments, the battery module of the battery pack includes a plurality of battery cells 10, connecting pieces 20 (the connecting pieces are covered by protective layers 30 in FIG. 2 and thus are not shown) and protective layers 30. The connecting piece 20 electrically connects two battery cells 10. The protective layer 30 includes a first protective portion 31 which covers the connecting piece 20, wherein a melting point of the first protective portion 31 is greater than that of the connecting piece 20.

FIG. 3 to FIG. 8 illustrates the structure of the battery module according to another embodiment of the present disclosure. In the description of the embodiments as shown in FIG. 3 to FIG. 8, thickness directions of the circuit board 40 and the connecting piece 20 refer to the z-coordinate directions in FIG. 3 to FIG. 6, that is, the up-down directions in FIG. 3 to FIG. 6. Length directions of the circuit board 40 and the connecting piece 20 refer to the x-coordinate directions in FIG. 3 to FIG. 6, that is, the left-right directions in FIG. 3 to FIG. 6. Width directions of the circuit board 40 and the connecting piece 20 refer to the y-coordinate directions in FIG. 3 to FIG. 6, that is, the front-rear directions in FIG. 3 to FIG. 6.

As shown in FIG. 3 to FIG. 6, the battery module provided by the embodiments of the present disclosure includes a plurality of battery cells 10 and a busbar assembly. The busbar assembly includes a circuit board 40, a connecting piece 20 and output electrodes electrically connected to the circuit board 40, a protective layer 30, and a fixing layer 50.

The connecting piece 20 electrically connects two battery cells 10 of the battery module. First ends of the output electrodes are electrically connected to poles 11 of the battery cells 10, and second ends of the output electrodes are electrically connected to outside of the battery module. The battery module includes two output electrodes, that is, a positive output electrode 61 and a negative output electrode 62.

As shown in FIG. 3 to FIG. 6, the protective layer 30 covers the connecting piece 20, the circuit board 40, the first end 61A of the positive output electrode 61 and the first end 62A of the negative output electrode 62.

The protective layer 30 is made from a material with a melting point greater than the melting point of the connecting piece 20. For example, the material of the protective layer 30 may be an insulating material whose melting point is greater than or equal to 660° C. The protective layer 30 may be made of mica paper, mica sheet or ceramic materials.

The protective layer 30 made from a heat-resistant insulating material covers the connecting piece 20, which not only is advantageous to prevent the connecting piece 20 from being fused by a high temperature, but also is advantageous to separate the connecting piece 20 from metal particles sprayed out of the battery cell 10 where thermal runaway occurs. In this way, it is advantageous to prevent the battery cells 10 from a short circuit, and to prevent the battery module from generating a chain reaction of thermal runaway, such that safety performance of the battery module and safety performance of the battery pack are improved. The protective layer 30 covers the circuit board 40, which is beneficial to prevent a sampling functionality of the circuit board 40 from being disabled in the event of thermal runaway of the battery module. In this way, a battery management system can send an alarm signal in time according to sampling data transmitted by the circuit board in case that the battery module breaks down. The protective layer 30 covers the first end of the output electrode, which is beneficial to prevent the output electrode from being burned out or short-circuited, and thus it is beneficial to improve the safety performance of the battery module and the safety performance of the battery pack including the battery module.

Figure 3:
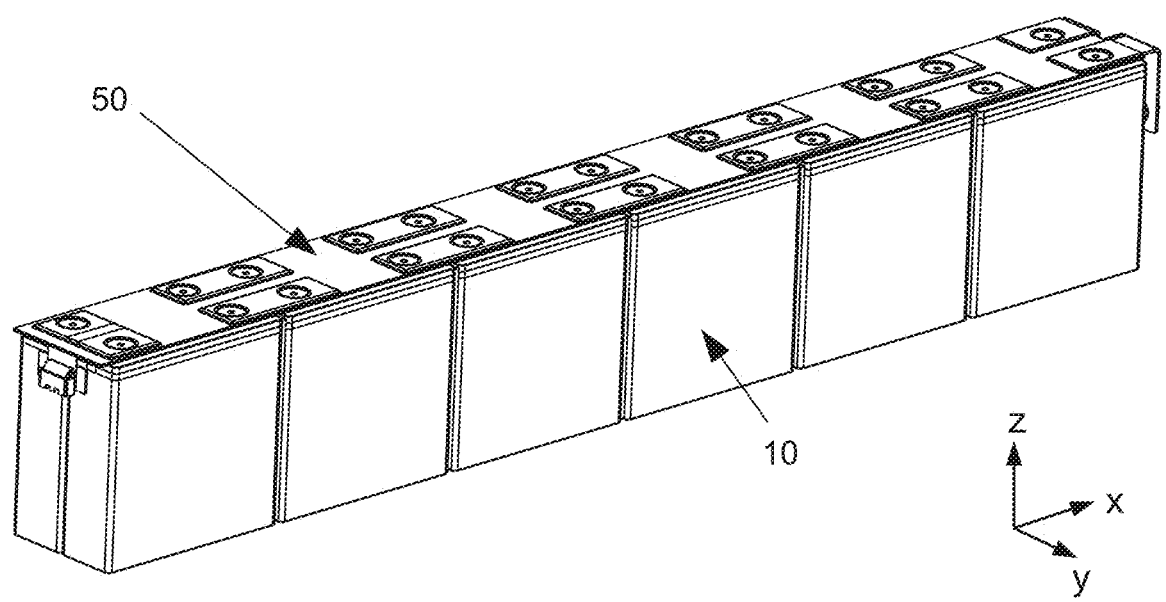
FIG. 3 is a schematic structural diagram of a battery module according to an embodiment of the present disclosure.

As shown in FIG. 3 and FIG. 6, the protective layer 30 includes a first protective portion 31 covering the connecting piece 20, a second protective portion 32 covering the circuit board 40, and a third protective portion 33 covering the first ends of the positive output electrode 61 and the negative output electrode 62.

As shown in FIG. 6 and FIG. 7, the first protective portion 31 includes a first upper protective portion 311, a first lower protective portion 312, and a first side protective portion 313. The first upper protective portion 311 covers an upper surface of the connecting piece 20 far away from the battery cells 10. The first lower protective portion 312 is arranged opposite to the first upper protective portion 311 and covers a lower surface of the connecting piece 20 facing to the battery cells 10. The first side protective portion 313 covers an outer side of the connecting piece 20 arranged between the upper surface and the lower surface of the connecting piece 20. The first side protective portion 313 is connected to the first upper protective portion 311. The first protective portion 31 is attached to the connecting piece 20.

As shown in FIG. 6, the second protective portion 32 includes a second upper protective portion 321 and a second lower protective portion 322. The second upper protective portion 321 covers an upper surface of the circuit board 40 far away from the battery cells 10. The second lower protective portion 322 is arranged opposite to the second upper protective portion 321 and covers a lower surface of the circuit board 40 facing to the battery cells 10. The second protective portion 32 is attached to the circuit board 30.

The third protective portion 33 includes a third upper protective portion 331, a third lower protective portion 332, and a second side protective portion 333. The third upper protective portion 331 covers an upper surface of the first end 61A of the positive output electrode 61 far away from the battery cells 10 and an upper surface of the first end 62A of the negative output electrode 62 far away from the battery cells 10. The third lower protective portion 332 is arranged opposite to the third upper protective portion 331 and covers a lower surface of the first end 61A of the positive output electrode 61 facing to the battery cells 10 and a lower surface of the first end 62A of the negative output electrode 62 facing to the battery cells 10. The second side protective portion 333 covers an outer side of the first end 61A of the positive output electrode 61 arranged between the upper surface and the lower surface of the first end 61A of the positive output electrode 61, and to cover an outer side of the first end 62A of the negative output electrode 62 arranged between the upper surface and the lower surface of the first end 62A of the negative output electrode 62. The second side protective portion 333 is connected to the third upper protective portion 331. The third protective portion 33 is attached to the first ends of the two output electrodes.

The first protective portion 31, the second protective portion 32 and the third protective portion 33 are all made of mica paper. The first protective portion 31, the second protective portion 32 and the third protective portion 33 are connected to each other.

The thickness and the structure of the protective layer 30 may be adjusted according to the material of the protective layer 30 and the actual use requirements of the battery module.

As shown in FIG. 4 and FIG. 6, the protective layer 30 includes an upper protective layer 30A and a lower protective layer 30B arranged oppositely. As shown in FIG. 3, surfaces of the connecting piece 20, the circuit board 40 and the output electrodes covered by the protective layers 30 are separated from each battery cell 10 in the assembly state that they are assembled with each battery cell 10. The upper protective layer 30A and the lower protective layer 30B of the protective layer 30 are respectively covered, as a whole structure, on two sides in the thickness direction of the connecting piece 20, the circuit board 40 and the first ends of the output electrodes. The upper protective layer 30A is arranged on the upper sides of the connecting piece 20, the circuit board 40 and the output electrodes, whereas the lower protective layer 30B is arranged on the lower sides of the connecting piece 20, the circuit board 40 and the first ends of the output electrodes.

As shown in FIG. 6 to FIG. 8, the upper protective layer 30A includes the aforementioned first upper protective portion 311, the first side protective portion 312, the second upper protective portion 321, the third upper protective portion 331, and the second side protective portion 333. The first upper protective portion 311, the first side protective portion 312, the second upper protective portion 321, the third upper protective portion 331 and the second side protective portion 333 are integrally formed.

As shown in FIG. 6, the lower protective layer 30B includes the aforementioned first lower protective portion 312, the second lower protective portion 322, and the third lower protective portion 332. The first lower protective portion 312, the second lower protective portion 322 and the third lower protective portion 332 are integrally formed.

As shown in FIG. 3 and FIG. 4, the battery module includes a plurality of battery cells 10 arranged in an array. In some embodiments, the twelve battery cells 10 are arranged in two rows along the front-rear direction (Y-coordinate direction). That is, six battery cells 10 are arranged in each row along the left-right direction (X-coordinate direction). The height direction of each battery cell 10 is the up-down direction (Z-coordinate direction), the length direction is the left-right direction, and the width direction is the front-rear direction. Each battery cell 10 is provided with two poles 11, that is, a positive pole and a negative pole. The connecting piece 20, the circuit board 40 and the first ends of the output electrodes are arranged above each battery cell 10. The connecting piece 20, the circuit board 40 and the first ends of the output electrodes are assembled and connected with the corresponding battery cells 10 to connect the battery cells 10 into a battery pack.

The circuit board 40 is electrically connected to each connecting piece 20, the positive output electrode 61, and the negative output electrode 62. The circuit board 40 may be a flexible printed circuit (FPC). The FPC is mainly composed of a base film, a copper busbar, and a heat-resistant protective film. One end of the FPC is provided with a signal collection end.

The connecting piece 20 is generally made of metal conductive materials such as aluminum or copper, and connects different battery cells 10. The positive output electrode 61, the negative output electrode 62 and each connecting piece 20 are provided with assembly holes. The connecting piece 20, the positive output electrode 61 and the negative output electrode 62 are welded to the poles 11 of the corresponding battery cells 10 at positions of the assembly holes. The positive output electrode 61 and the negative output electrode 62 implement electrical connection between the battery module and the outside. Each of the first end 61A of the positive output electrode 61 and the first end 62A of the negative output electrode 62 is correspondingly electrically connected to one pole 11 of the battery cell 10 on the right in FIG. 4. The second ends of the positive output electrode 61 and the negative output electrode 62 serve as the output ends of the output electrodes.

Both the positive output electrode 61 and the negative output electrode 62 are bent into an L shape. The two output electrodes are generally made of metal conductive materials such as aluminum or copper.

The protective layer 30 is provided with positioning holes corresponding to positions of assembly holes or welding avoidance holes for assembling the connecting piece 20, the circuit board 40 and the first ends of the output electrodes, and location and installation of the connecting piece 20, the circuit board 40 and the first ends of the output electrodes are implemented through these positioning holes. In this embodiment, the protective layer 30 is made of mica paper.

In the embodiments as shown in FIG. 3 to FIG. 8, the protective layer 30 is used for protecting the connecting piece 20, the circuit board 40, and the first ends of the output electrodes. The protective layer 30 covers the connecting piece 20, which can protect the connecting piece 20, such that it is beneficial to prevent the connecting piece 20 from being heated and melted in the event of thermal runaway of the battery module, and to prevent from causing a chain reaction of thermal runaway. Because the protective layer 30 covers the circuit board 40, the protective layer 30 also protects the circuit board 40 to help to prevent the sampling functionality of the circuit board 40 from being disabled in the event of thermal runaway of the battery module. The protective layer 30 covers the first ends of the output electrodes, which is also beneficial to prevent the output electrodes from being damaged or short-circuited in the event of thermal runaway of the battery module.

As shown in FIG. 3 to FIG. 6, both the upper protective layer 30A and the lower protective layer 30B of the protective layer 30 are provided with positioning holes.

As shown in FIG. 3 to FIG. 6, the fixing layer 50 is arranged outside the protective layer 30, the connecting piece 20, the circuit board 40, and the first ends of the output electrodes. The fixing layer 50 not only can play a protective effect of insulation, but also can fix the protective layer 30, the connecting piece 20, the circuit board 40 and the output electrodes as a whole.

The fixing layer 50 may be made from a polymer material with insulating properties, such as polyethylene terephthalate (PET), polyimide (PI), polycarbonate (PC) and polyethylene naphthalate (PEN), etc.

On one hand, the fixing layer 50 insulates the part of the busbar assembly covered by the fixing layer 50 from other parts of the battery module, and on the other hand, the fixing layer 50 can fix the protective layer 30, the connecting piece 20, the circuit board 40 and the output electrodes together to prevent the protective layer 30 from falling off or shifting.

As shown in FIG. 4 and FIG. 6, the fixing layer 50 includes an upper fixing layer 50A and a lower fixing layer 50B. The upper fixing layer 50A is arranged above the upper protective layer 30A, and the lower fixing layer 50B is arranged below the lower protective layer 30B. The upper fixing layer 50A and the lower fixing layer 50B fix the upper protective layer 30A and the lower protective layer 30B to the connecting piece 20, the circuit board 40, and the output electrodes. The upper fixing layer 50A fits with the upper protective layer 30A in the shape. The lower fixing layer 50B fits with the lower protective layer 30B in the shape.

Similar to the protective layer 30, the fixing layer 50 is provided with positioning holes corresponding to positions of assembly holes or welding avoidance holes for assembling the connecting piece 20, the circuit board 40 and the first ends of the output electrodes, and location and installation of the connecting piece 20, the circuit board 40 and the first ends of the output electrodes is implemented through these positioning holes. As shown in FIG. 3 to FIG. 6, both the upper fixing layer 50A and the lower fixing layer 50B of the fixing layer 50 are provided with the positioning holes.

In order to better fix the protective layer 30 and prevent the protective layer 30 from falling off, the protective layer 30 and the fixing layer 50 are formed and fixed by a hot pressing process, and the upper fixing layer 50A and the lower fixing layer 50B are hermetically connected. On one hand, the upper protective layer 30A and the lower protective layer 30B arranged on the upper and lower sides of the connecting piece 20, the circuit board 40 and the first ends of the output electrodes may be completely attached to the connecting piece 20, the circuit board 40 and the first ends of the output electrodes in conformity with contours of the same. On the other hand, edge portions of the upper fixing layer 50A and the lower fixing layer 50B may be fixedly connected by the hot pressing process, such that the connecting piece 20, the circuit board 40, the output electrodes and the protective layer 30 are arranged in the fixing layer 50.

Finally, it should be noted that the foregoing embodiments are merely intended for describing the technical solutions of the present disclosure, but not for limiting the present disclosure. Although the present disclosure is described in detail with reference to the preferred embodiments, persons of ordinary skill in the art should understand that they may still make modifications to the specific embodiments of the present disclosure or make equivalent replacements to some technical features without departing from the spirit of the technical solutions of the present disclosure, which shall fall within the scope of the technical solutions claimed in the present disclosure.

What is claimed is:

1. A battery module, comprising:
   at least two battery cells;
   a connecting piece configured to electrically connect two battery cells of the at least two battery cells;
   a circuit board with a sampling functionality electrically connected to the at least two battery cells; and
   a protective layer comprising a first protective portion configured to cover the connecting piece and a second protective portion configured to cover the circuit board and connected to the first protective portion, the second protective portion and the first protective portion being made from the same material,
   wherein a melting point of the first protective portion is greater than that of the connecting piece,
   wherein the first protective portion comprises a first side protective portion configured to cover an outer side of the connecting piece, and
   wherein the second protective portion comprises:
      a second upper protective portion configured to cover an upper surface of the circuit board away from the at least two battery cells; and
      a second lower protective portion arranged opposite to the second upper protective portion and configured to cover a lower surface of the circuit board facing to the at least two battery cells.

2. The battery module according to claim 1, wherein the first protective portion comprises:
   a first upper protective portion configured to cover an upper surface of the connecting piece away from the at least two battery cells; and
   a first lower protective portion arranged opposite to the first upper protective portion and configured to cover a lower surface of the connecting piece facing to the at least two battery cells.

3. The battery module according to claim 2, wherein the first side protective portion is arranged between the upper surface and the lower surface of the connecting piece.

4. The battery module according to claim 1, wherein the first side protective portion is connected to the first upper protective portion and/or the first lower protective portion.

5. The battery module according to claim 1, wherein the first protective portion is attached or adhered to the connecting piece.

6. The battery module according to claim 1, wherein the first protective portion is made from an insulating material with a melting point greater than or equal to 660° C.

7. The battery module according to claim 1, wherein the battery module further comprises an output electrode configured to output electrical energy of the battery module,
   wherein a first end of the output electrode is configured to electrically connect to the at least two battery cells, and
   wherein the protective layer further comprises a third protective portion configured to cover the first end of the output electrode.

8. The battery module according to claim 7, wherein the third protective portion and the first protective portion are made from the same material.

9. The battery module according to claim 7, wherein the third protective portion is connected to the first protective portion.

10. The battery module according to claim 7, wherein the third protective portion comprises:
    a third upper protective portion configured to cover an upper surface of the first end of the output electrode away from the at least two battery cells; and
    a third lower protective portion arranged opposite to the third upper protective portion and configured to cover a lower surface of the first end of the output electrode facing to the at least two battery cells.

11. The battery module according to claim 10, wherein the third protective portion further comprises a second side protective portion configured to cover an outer side of the first end of the output electrode arranged between the upper surface and the lower surface of the first end of the output electrode.

12. The battery module according to claim 1, further comprising a fixing layer arranged outside the protective layer and the connecting piece to fix the protective layer and the connecting piece as a whole.

13. The battery module according to claim 12, wherein the fixing layer comprises:
    an upper fixing layer arranged above the connecting piece and the protective layer; and
    a lower fixing layer arranged below the connecting piece and the protective layer.

14. The battery module according to claim 13, wherein the upper fixing layer is hermetically connected to the lower fixing layer.

15. A battery pack comprising a plurality of battery modules, each battery module comprising:
    at least two battery cells;
    a connecting piece configured to electrically connect two battery cells of the at least two battery cells;
    a circuit board with a sampling functionality electrically connected to the at least two battery cells; and
    a protective layer comprising a first protective portion configured to cover the connecting piece and a second protective portion configured to cover the circuit board and connected to the first protective portion, the second protective portion and the first protective portion being made from the same material;

wherein a melting point of the first protective portion is greater than that of the connecting piece, wherein the first protective portion comprises a first side protective portion configured to cover an outer side of the connecting piece, and wherein the second protective portion comprises:
- a second upper protective portion configured to cover an upper surface of the circuit board away from the at least two battery cells; and
- a second lower protective portion arranged opposite to the second upper protective portion and configured to cover a lower surface of the circuit board facing to the at least two battery cells.

16. A device comprising:

a power source comprising a battery module, wherein the battery module comprises:
- at least two battery cells;
- a connecting piece configured to electrically connect two battery cells of the at least two battery cells;
- a circuit board with a sampling functionality electrically connected to the at least two battery cells; and
- a protective layer comprising a first protective portion configured to cover the connecting piece and a second protective portion configured to cover the circuit board and connected to the first protective portion, the second protective portion and the first protective portion being made from the same material;

wherein a melting point of the first protective portion is greater than that of the connecting piece, wherein the first protective portion comprises a first side protective portion configured to cover an outer side of the connecting piece, and wherein the second protective portion comprises:
- a second upper protective portion configured to cover an upper surface of the circuit board away from the at least two battery cells; and
- a second lower protective portion arranged opposite to the second upper protective portion and configured to cover a lower surface of the circuit board facing to the at least two battery cells.

\* \* \* \* \*